United States Patent

DuHack et al.

[19]

[11] Patent Number: 5,964,447
[45] Date of Patent: Oct. 12, 1999

[54] WATER VALVE ASSEMBLY HAVING ATTACHMENT MECHANISM WHICH PREVENTS A FLUID CONDUIT FROM BECOMING DETACHED FROM A VALVE BODY

[75] Inventors: Michael R. DuHack, Marion County; Neil E. Grah, Hendricks County, both of Ind.

[73] Assignee: Emerson Electric Co., St. Louis, Mo.

[21] Appl. No.: 08/833,114

[22] Filed: Apr. 3, 1997

[51] Int. Cl.$^6$ .................................................. F16K 51/00
[52] U.S. Cl. ........................... 251/148; 137/143; 137/343
[58] Field of Search ........................... 251/148; 137/343, 137/143

[56] References Cited

U.S. PATENT DOCUMENTS

| | | | |
|---|---|---|---|
| 3,357,678 | 12/1967 | Dyki | 251/148 |
| 3,751,002 | 8/1973 | Folkerts et al. | 251/148 |
| 3,924,882 | 12/1975 | Ellis | 285/175 |
| 4,149,554 | 4/1979 | Pease | 137/343 |
| 4,280,527 | 7/1981 | Pease | 137/343 |
| 4,911,406 | 3/1990 | Attwood | 251/148 |
| 5,083,819 | 1/1992 | Bynum | 285/89 |
| 5,496,076 | 3/1996 | Lin | 285/110 |

*Primary Examiner*—A. Michael Chambers
*Attorney, Agent, or Firm*—Mark D. Becker

[57] ABSTRACT

A water valve assembly includes a valve body having defined therein (1) a first channel, and (2) a first threaded portion. The water valve assembly also includes a first stop attached to the valve body and a second stop attached to the valve body, the second stop being positioned relative to the first stop such that a recess is defined therebetween. The water valve assembly further includes an attachment mechanism having a base and an arm attached to the base. The attachment mechanism has defined therein (1) a second channel, and (2) a second threaded portion. The arm includes a tab, and the arm is positionable in a first lowered position relative to the base when the tab is located outside of the recess. In addition, the arm is positionable in a second lowered position relative to the base when the tab is located within the recess. Furthermore, the tab contacts the first stop so as to move the arm relative to the base when the arm is moved from the first lowered position to the second lowered position.

20 Claims, 8 Drawing Sheets

WATER VALVE ASSEMBLY HAVING ATTACHMENT MECHANISM WHICH PREVENTS A FLUID CONDUIT FROM BECOMING DETACHED FROM A VALVE BODY

BACKGROUND OF THE INVENTION

The present invention generally relates to water valves, and more specifically to a water valve assembly having an attachment mechanism which prevents a fluid conduit from becoming detached from a valve body.

Water valve assemblies are commonly used in many household appliances such as dishwashers, clothes washers and refrigerator icemakers. Such appliance water valve assemblies generally include a valve body having a fluid channel defined therein. The fluid channel receives a portion of a fluid conduit for conveying water to various locations within the household appliance.

Water valve assemblies also include other components, such as a filter and a flow control member, contained within the fluid channel. Water valve assemblies further include a threaded cap or base screwed onto a complimentary threaded end portion of the valve body. The threaded cap fits around the fluid conduit and functions to maintain the fluid conduit within the fluid channel. The threaded cap also functions to keep the filter and the flow control member, as well as other parts, located within the channel.

Often during maintenance of the household appliance, the threaded cap must be unscrewed from the valve body to gain access to the fluid channel of the water valve assembly. Many water valve assemblies require that the threaded cap be removed from the valve body with a tool such as a wrench. Once the maintenance work is complete, the threaded cap is screwed back onto the valve body with the tool. As with its removal, the threaded cap is screwed back onto the valve body by using the tool.

One problem associated with the above described arrangement is that the threaded cap can be over tightened when screwed back onto the valve body once the maintenance work is complete. Over tightening the threaded cap can damage the valve body and/or the threaded cap which can cause the water valve assembly to leak during use of the household appliance.

A further problem associated with the above described arrangement is that the threaded cap can inadvertently become unscrewed from the valve body due to vibration generated during use or shipment of the household appliance. If the threaded cap becomes unscrewed from the valve body, water can leak from the water valve assembly during use of the household appliance, or valve parts contained within the channel can spill out during shipment of the household appliance.

Another problem associated with the above described arrangement is that the water valve assembly is usually positioned in the household appliance in a very confined space. Therefore, the use of a tool to unscrew the threaded cap from the valve body in this confined space is very difficult.

It would therefore be desirable to provide a water valve assembly having an attachment mechanism that prevents a fluid conduit from becoming inadvertently detached from a valve body. It would further be desirable to provide a water valve assembly having an attachment mechanism which is configured so as to prevent over tightening thereof. It would also be desirable to provide a water valve assembly having an attachment mechanism that allows a fluid conduit to be attached and detached from a valve body without the use of a tool.

SUMMARY OF THE INVENTION

In accordance with one embodiment of the present invention, there is provided a water valve assembly including a valve body having defined therein (1) a first channel, and (2) a first threaded portion. The water valve assembly also includes a first stop attached to the valve body and a second stop attached to the valve body, the second stop being positioned relative to the first stop such that a recess is defined therebetween. The water valve assembly further includes an attachment mechanism having a base and an arm attached to the base. The attachment mechanism has defined therein (1) a second channel, and (2) a second threaded portion. The arm includes a tab, and the arm is positionable in a first lowered position relative to the base when the tab is located outside of the recess. In addition, the arm is positionable in a second lowered position relative to the base when the tab is located within the recess. Furthermore, the tab contacts the first stop so as to move the arm relative to the base when the arm is moved from the first lowered position to the second lowered position.

In accordance with another embodiment of the present invention, there is provided a water valve assembly which includes a valve body and a stop structure attached to the valve body, the stop structure having a recess defined therein. The water valve assembly also includes an attachment mechanism having a base and an arm, the arm being attached to the base, and the arm including a tab. The arm is positionable in a first lowered position relative to the base when the tab is located outside of the recess. In addition, the arm is positionable in a second lowered position relative to the base when the tab is located within the recess. Furthermore, the tab contacts the stop structure so as to move the arm relative to the base when the arm is moved from the first lowered position to the second lowered position.

It is therefore an object of the present invention to provide a new and useful water valve assembly.

It is another object of the present invention to provide an improved water valve assembly.

It is still another object of the present invention to provide a water valve assembly having an attachment mechanism that prevents a fluid conduit from becoming inadvertently detached from a valve body.

It is yet another object of the present invention to provide a water valve assembly having an attachment mechanism which is configured to so as to prevent overtightening thereof.

It is yet another object of the present invention to provide a water valve assembly having an attachment mechanism that allows a fluid conduit to be attached and detached from a valve body without the use of a tool.

The above and other objects, features, and advantages of the present invention will become apparent from the following description and attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
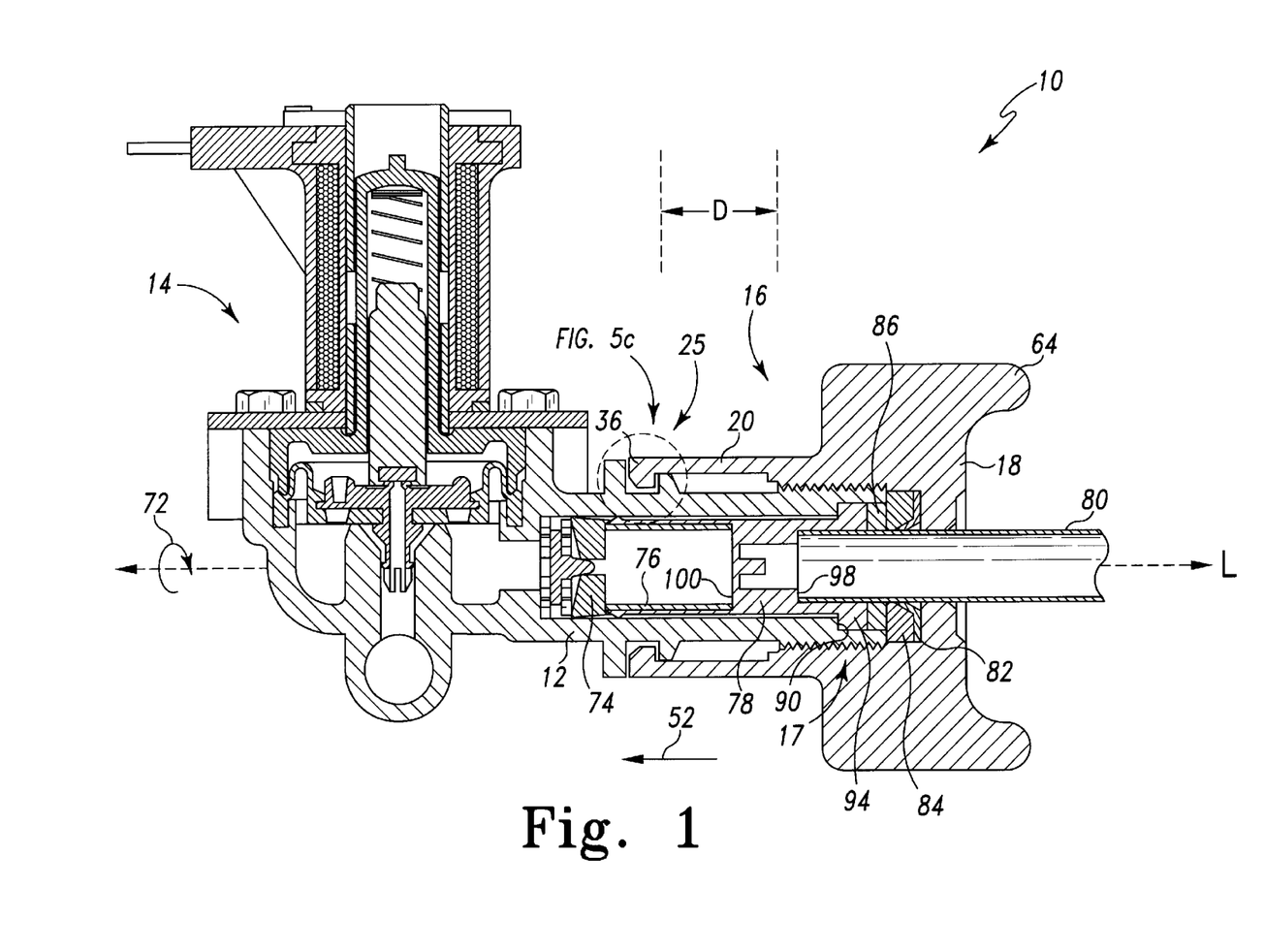
FIG. 1 is a cross sectional view of a water valve assembly which incorporates the features of the present invention therein.

Referring now to FIG. 1, there is shown a water valve assembly 10 secured to a fluid conduit 80. Water valve assembly 10 is used in a household appliance (not shown) such as a dishwasher, a clothes washer or refrigerator icemaker. Water valve assembly 10 selectively enables a flow of water to enter the household appliance. Water valve assembly 10 includes a valve body 12 and a valve actuator mechanism 14. Valve actuator mechanism 14 controls the flow of water which is delivered into the water valve assembly 10. Water valve assembly 10 also includes an attachment mechanism 16 and a fluid conduit support assembly 17. Water valve assembly 10 further includes a stop structure 25 attached to valve body 12.

Figure 2:
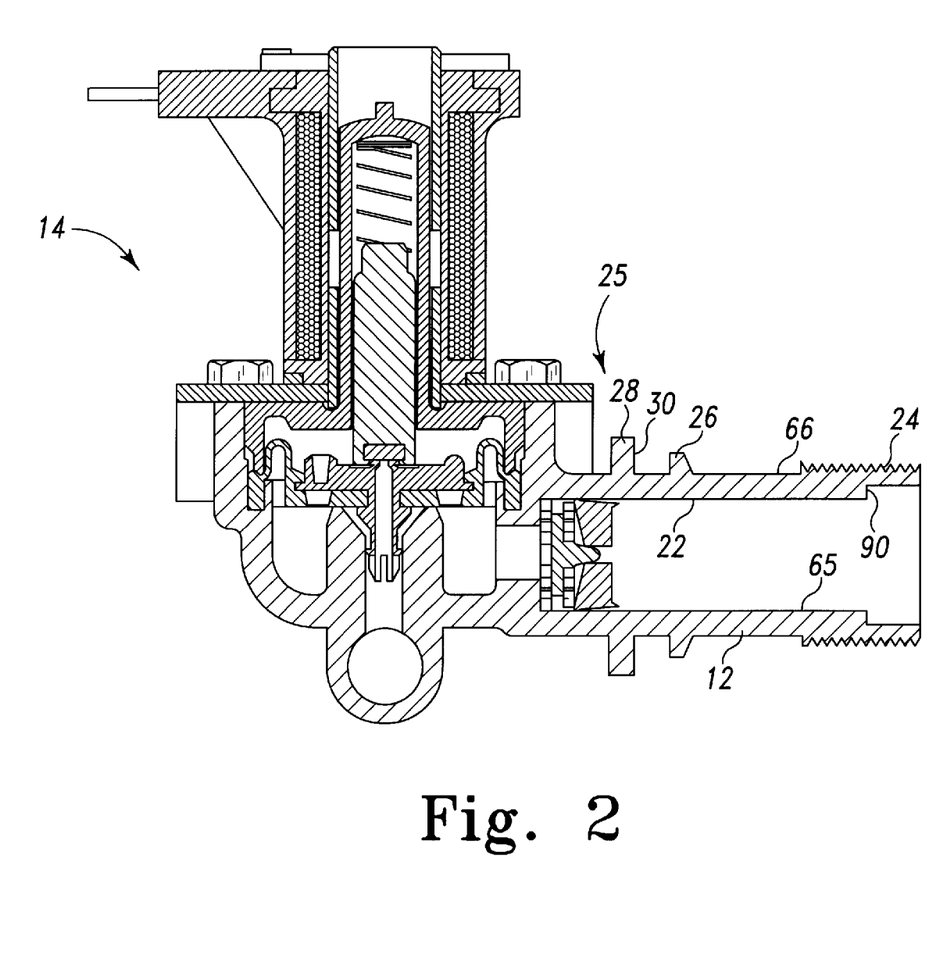
FIG. 2 is a cross sectional view of the water valve assembly of FIG. 1, with the attachment mechanism and the fluid conduit support assembly removed for clarity of description.

Referring now to FIG. 2, valve body 12 includes an interior surface 65 and an exterior surface 66. Valve body 12 also has defined therein a channel 22 and a threaded portion 24 defined in exterior surface 66. Channel 22 defines a central axis L (se FIG. 1). Interior surface 65 has a shoulder 90 defined thereon.

Figure 3:
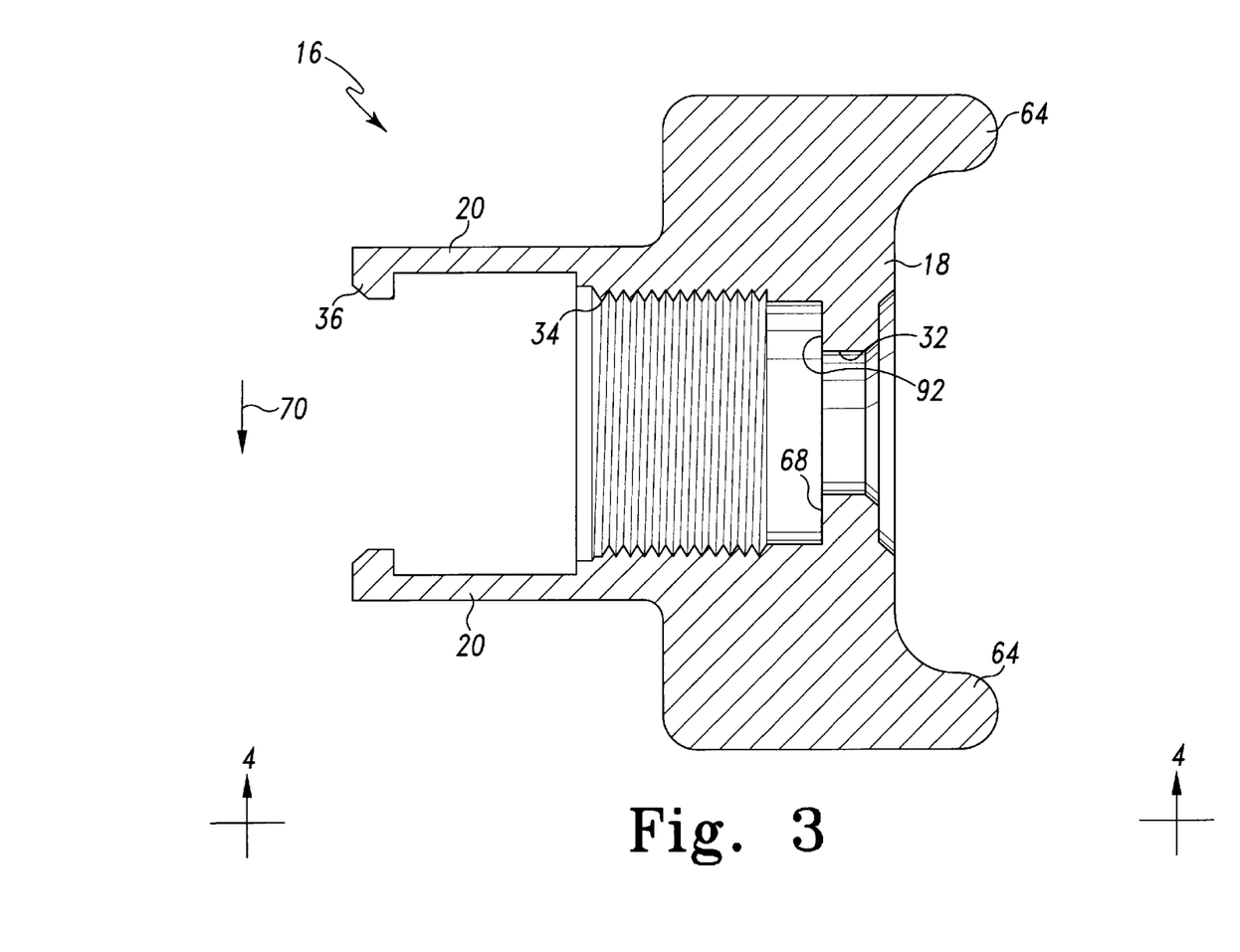
FIG. 3 is an enlarged cross sectional view of the attachment mechanism of FIG. 1.
Figure 4:
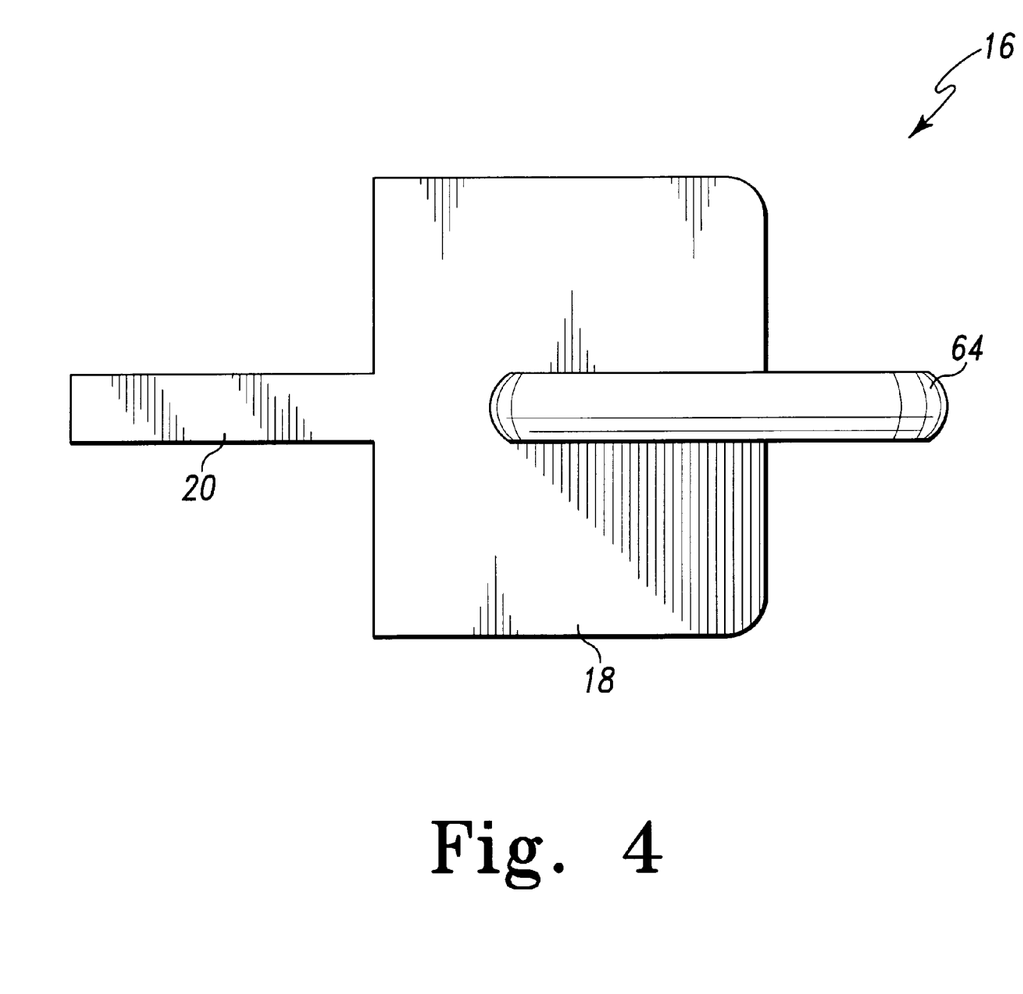
FIG. 4 is a side elevational view of the attachment mechanism taken along line 4—4 of FIG. 3 as viewed in the direction of the arrows (note that the attachment mechanism is not shown in cross section for clarity of description)

Referring now to FIGS. 3 and 4, attachment mechanism 16 has a channel 32 defined therein. Attachment mechanism 16 also has a threaded portion 34 defined in an interior surface 68 thereof. Interior surface 68 also has a shoulder 92 defined thereon. In addition, attachment mechanism 16 has a base 18 and an arm 20 attached to base 18. Arm 20 includes a tab 36. The tab 36 is axially spaced apart from the threaded portion 34 relative to the central axis L by a distance D (see FIG. 1).

Attachment mechanism 16 further includes a gripping flange 64 extending outwardly from base 18. Preferably, base 18, arm 20 and gripping flange 64 are integrally molded as a single part from a plastic material. Having arm 20 made from a plastic material allows arm 20 to flex or bend relative to base 18 when a sufficient force is applied to arm 20.

Specifically, arm 20 is able to flex relative to base 18 in a direction indicated by arrow 70, and in a direction opposite to the direction indicated by arrow 70. Preferably, the plastic material from which base 18, arm 20 and gripping flange 64 are made from is polypropylene.

Figure 5A:
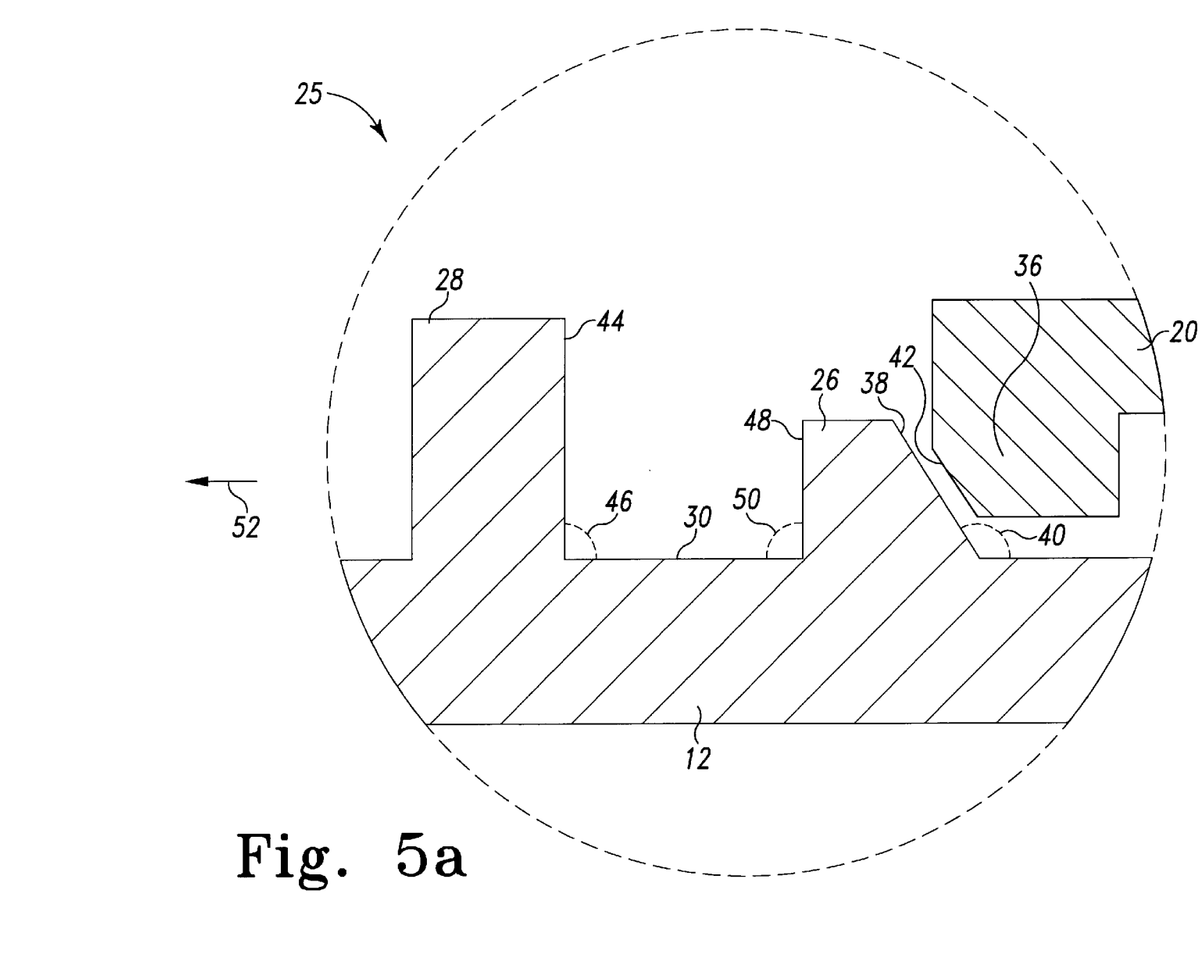
FIG. 5a is a view similar to FIG. 5c, with the arm of the attachment mechanism positioned in the first lowered position.

Referring now to FIG. 5a (see also FIG. 2), stop structure 25 includes a first stop 26 and a second stop 28 attached to valve body 12. Preferably, valve body 12, first stop 26 and second stop 28 are integrally molded as a single part from a plastic material. Preferably, the plastic material from which valve body 12, first stop 26 and second stop 28 are made from is polypropylene.

Second stop 28 is positioned relative to first stop 26 such that a recess 30 is defined therebetween. First stop 26 includes a cam surface 38. A first angle 40 is defined by cam surface 38 and valve body 12. First angle 40 has a magnitude greater than 90°. Preferably, the magnitude of first angle 40 is 120° to 150°.

Second stop 28 includes a stop surface 44. A second angle 46 is defined by stop surface 44 and valve body 12. Second angle 46 has a magnitude approximately equal to 90°.

First stop 26 also includes an abutment surface 48. A third angle 50 is defined by abutment surface 48 and valve body 12. Third angle 50 has a magnitude approximately equal to 90°.

Figure 5B:
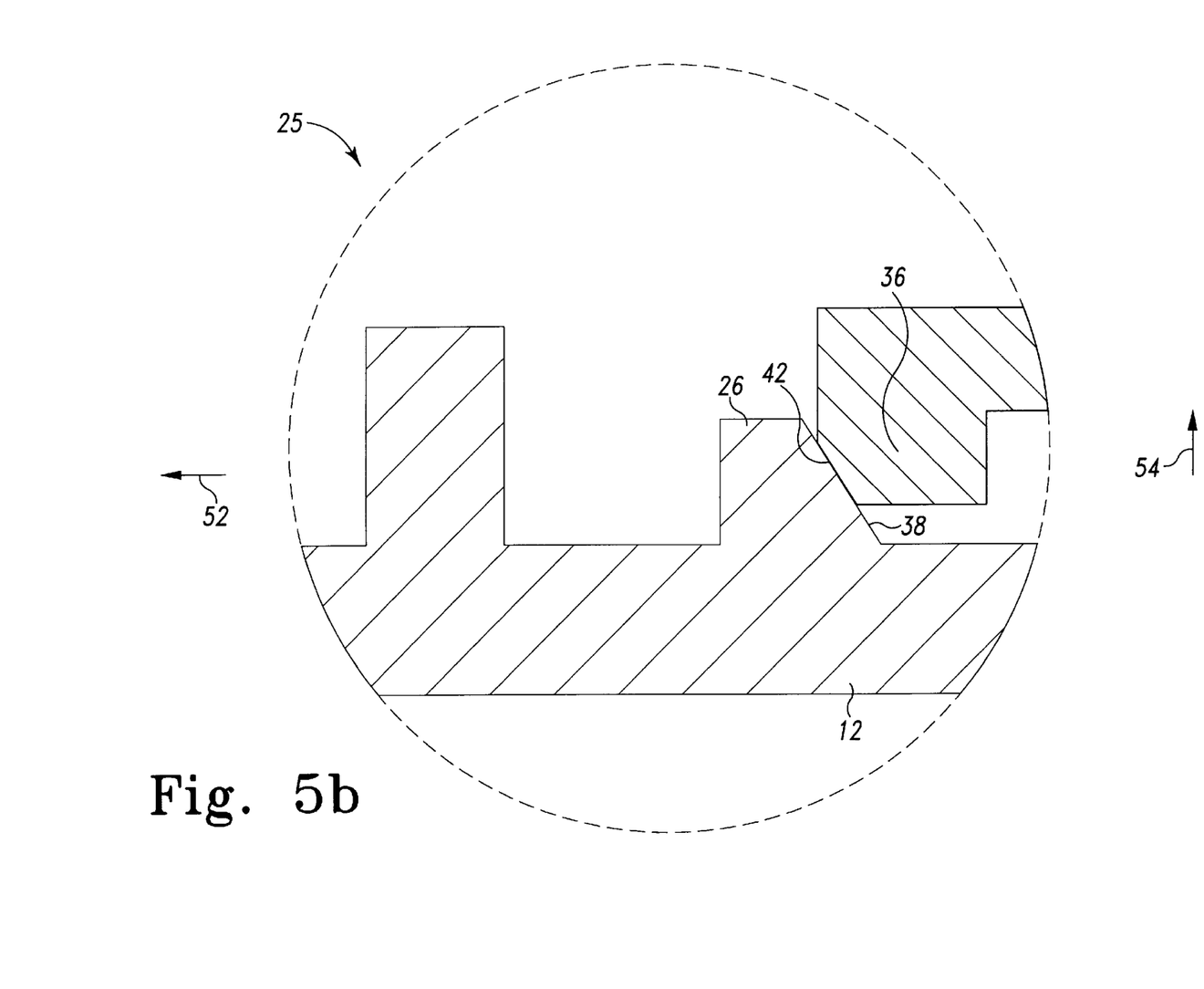
FIG. 5b is a view similar to FIG. 5c, but showing the cam follower surface of the tab positioned in contact with the cam surface of the first stop.
Figure 5C:
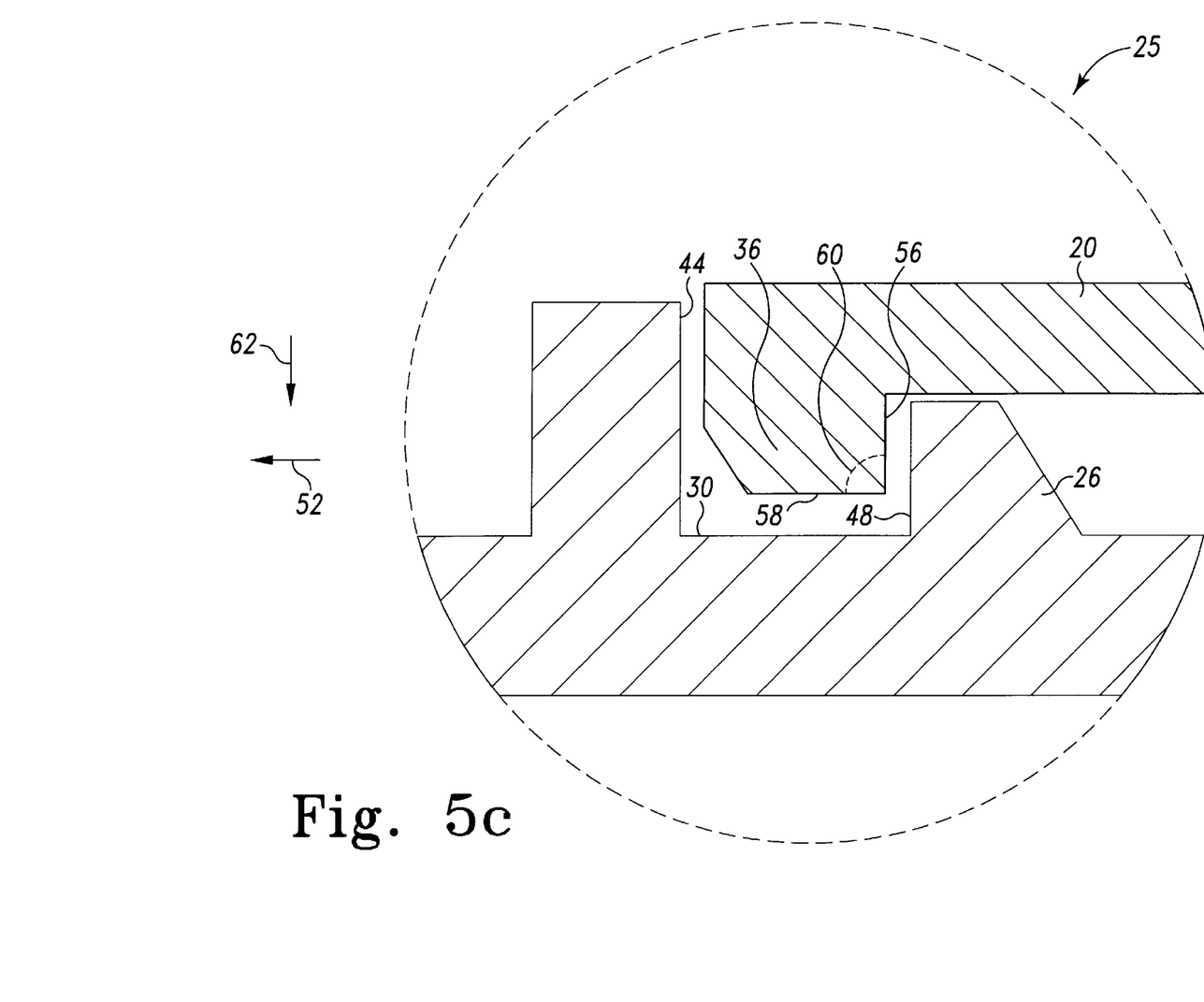
FIG. 5c is an enlarged view of a portion of FIG. 1 which is encircled and indicated as FIG. 5c, which shows the tab located within the recess of the stop structure and the arm of the attachment mechanism positioned in the second lowered position.

As shown in FIGS. 5a, 5b, and 5c, tab 36 includes a cam follower surface 42. Tab 36 further includes a rear face 56 and a lower face 58 (see FIG. 5c). A fourth angle 60 is defined by rear face 56 and lower face 58. Fourth angle 60 has a magnitude approximately equal to 90°.

Referring back to FIG. 1, attachment mechanism 16 is positioned relative to valve body 12 such that threaded portion 24 (see FIG. 2) of valve body 12 meshingly engages with threaded portion 34 (see FIG. 3) of attachment mechanism 16. Attachment mechanism 16 moves relative to valve body 12 in a direction indicated by arrow 52 (see FIG. 1) as attachment mechanism 16 is rotated relative to valve body 12 in a direction indicated by arrow 72 (see FIG. 1). The above described rotation and meshing engagement screws attachment mechanism 16 onto valve body 12 and thus secures attachment mechanism 16 to valve body 12. Screwing attachment mechanism 16 onto valve body 12 alignes channel 22 (see FIG. 2) with channel 32 (see FIG. 3).

It should be understood that gripping flange 64 allows the above described rotation of attachment mechanism 16 to be accomplished without the use of any tools. In other words, one can grasp gripping flange 64 with a hand and rotate attachment mechanism 16 in the direction indicated by arrow 72 (see FIG. 1) to secure attachment mechanism 16 to valve body 12. Alternatively, one can grasp gripping flange 64 with a hand and rotate attachment mechanism 16 in a direction opposite to the direction indicated by arrow 72 to detach attachment mechanism 16 from valve body 12. This is an important aspect of the present invention since water valve assembly 10 is typically positioned within a household appliance in a very confined location that makes the use of tools difficult. Thus, it should be appreciated that gripping flange 64 facilitates maintenance work required by water valve assembly 10 that necessitates the detachment of attachment mechanism 16 from valve body 12.

Referring again to FIG. 5a, there is shown arm 20 and tab 36 when tab 36 is located outside of recess 30 of stop structure 25. As shown in FIG. 5a, arm 20 is positioned in a first lowered position relative to base 18 (see FIG. 3) when tab 36 is located outside of recess 30.

It should be appreciated that arm 20 is positioned in the first lowered position when attachment mechanism 16 is initially secured to valve body 12. However, as attachment mechanism 16 is rotated relative to valve body 12 in the direction indicated by arrow 72 (see FIG. 1), arm 20 and therefore tab 36, move relative to valve body 12 in the direction indicated by arrow 52. Movement of arm 20 in the direction indicated by arrow 52 brings cam follower surface 42 into contact with cam surface 38 of first stop 26 as shown in FIG. 5b. Moving tab 36 in the direction indicated by arrow 52 while cam follower surface 42 is in contact with cam surface 38 causes tab 36 and arm 20 to move relative to valve body 12 (and base 18; see FIG. 3) in a direction indicated by arrow 54 (see FIG. 5b).

As shown in FIG. 5c, further advancement of arm 20 in the direction indicated by arrow 52 causes tab 36 to slip over first stop 26. Once tab 36 slips over first stop 26, arm 20 and tab 36 move relative to valve body 12 (and base 18; see FIG. 3) in a direction indicated by arrow 62. Movement of tab 36 in the direction indicated by arrow 62 locates tab 36 within recess 30. When tab 36 is located within recess 38, the arm 20 is positioned at a second lowered position relative to base 18.

Having tab 36 located within recess 30 and arm 20 positioned in the second lowered position prevents attachment mechanism 16 from accidentally becoming detached from valve body 12. Since attachment member 16 is prevented from accidentally becoming detached from valve body 12, the fluid conduit 80 is correspondingly prevented from becoming detached from valve body 12. For example, rotation of attachment mechanism 16 in a direction opposite to the direction indicated by arrow 72 (see FIG. 1) will cause tab 36 to move in a direction opposite to the direction indicated by arrow 52 (see FIG. 1). However, the movement of tab 36 in the above described direction is stopped when rear face 56 comes into contact with abutment surface 48 (see FIG. 5c). Furthermore, it should be understood that having third angle 50 (see FIG. 5a) and fourth angle 60 (see FIG. 5c) approximately equal to 90° significantly enhances the ability of stop structure 25 to prevent tab 36 from moving in a direction opposite to the direction indicated by arrow 52.

However, it should be understood that attachment mechanism 16 can be purposely detached from valve body 12. Specifically, tab 36 can be removed from recess 30 by grasping arm 20 with one's fingers and moving arm 20 in the direction indicated by arrow 54 (see FIG. 5b). Removing tab 36 from recess 30 allows tab 36 to move past first stop 26 in a direction opposite to the direction indicated by arrow 52 (see FIG. 5c). Thus, attachment mechanism 16 can be rotated in a direction opposite to the direction indicated by arrow 72 (see FIG. 1) so as to detach attachment mechanism 16 from valve body 12.

Additionally, having tab 36 located within recess 30 and arm 20 positioned in the second lowered position prevents attachment mechanism 16 and valve body 12 from being damaged by screwing attachment mechanism 16 too tightly onto valve body 12. Specifically, once tab 36 is located within recess 30, additional rotation of attachment mechanism 16 in the direction indicated by arrow 72 (see FIG. 1) will cause tab 36 to move in the direction indicated by arrow 52 (see FIG. 5c) and come into contact with stop surface 44 (see FIG. 5c). Having tab 36 in contact with stop surface 44 inhibits any further rotation of attachment mechanism 16 in the above described manner, and thus prevents attachment mechanism 16 from being screwed too tightly onto valve body 12. Furthermore, it should be understood that having second angle 46 (see FIG. 5a) approximately equal to 90° significantly enhances the ability of stop structure 25 to prevent attachment mechanism 16 from being screwed too tightly onto valve body 12.

Figure 6:
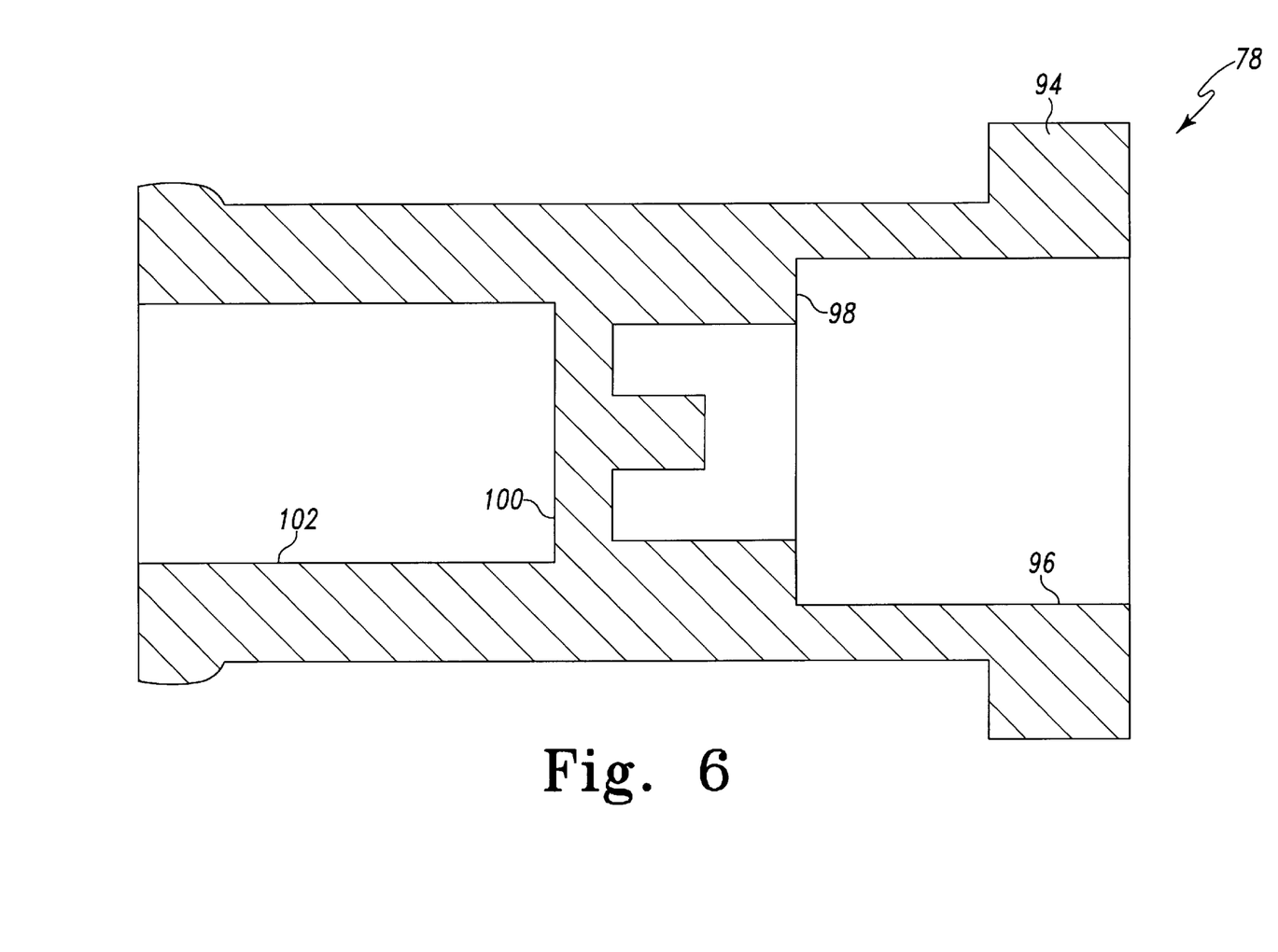
FIG. 6 is an enlarged cross sectional view of the support member of the water valve assembly of FIG. 1.

Referring again to FIG. 1, fluid conduit support assembly 17, includes a support member 78, a gripper ring 82, a spacer ring 84 and an O-ring 86. Support member 78 has a chamber 96 and a cavity 102 defined therein (see FIG. 6). Support member 78 also includes a wall 98 and a wall 100. Support member 78 further includes a lip 94 attached thereto (see FIG. 6).

A filter 76 is positioned within cavity 102 and in contact with wall 100. Support member 78 is positioned within first channel 22 (see FIG. 2) such that support member 78 and filter 76 contact a flow control member 74 (also located in channel 22). Support member 78 is further positioned in first channel 22 such that lip 94 contacts shoulder 90 (see FIG. 2) of valve body 12. Fluid conduit 80 is positioned within chamber 96 such that fluid conduit 80 contacts wall 98. O-ring 86 is disposed around fluid conduit 80 such that O-ring 86 contacts lip 94. Gripper ring 82 is disposed around and secured to fluid conduit 80 such that gripper ring 82 contacts shoulder 92 (see FIG. 3) of attachment mechanism 16. Spacer ring 84 is interposed between and in contact with O-ring 86 and gripper ring 82.

As attachment mechanism 16 is rotated relative to valve body 12 in the direction indicated by arrow 72, attachment mechanism 16 moves in the direction indicated by arrow 52. Movement of attachment mechanism 16 in the above described manner causes gripper ring 82, spacer ring 84 and fluid conduit 80 to also move in the direction indicated by arrow 52. Movement of gripper ring 82 and spacer ring 84 causes a compressive force to be communicated to O-ring 86. The aforementioned compressive force causes O-ring 86 to expand radially and thus sealingly engage valve body 12, fluid conduit 80, lip 94 and spacer ring 84. Therefore, it should be understood that a water tight seal is formed between O-ring 86 and valve body 12, fluid conduit 80, lip 94 and spacer ring 84.

In addition, movement of fluid conduit 80 in the direction indicated by arrow 52 causes fluid conduit 80 to be securely seated in contact with wall 98. Having fluid conduit 80 securely seated in contact with wall 98 helps hold support member 78 in place which in turn holds filter 76 and flow control member 74 in place during use of water valve assembly 10.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A water valve assembly, comprising:

a valve body having defined therein (1) a first channel, and (2) a first threaded portion;

a first stop attached to said valve body;

a second stop attached to said valve body, said second stop being positioned relative to said first stop such that a recess is defined therebetween; and an attachment mechanism having a base and an arm attached to said base, said attachment mechanism having defined therein (1) a second channel, and (2) a second threaded portion, wherein said arm includes a tab, wherein said arm is positionable in a first lowered position relative to said base when said tab is located outside of said recess, wherein said arm is positionable in a second lowered position relative to said base when said tab is located within said recess, and wherein said tab contacts said first stop so as to move said arm relative to said base when said arm is moved from said first lowered position to said second lowered position.

2. The assembly of claim 1, wherein:

said first threaded portion meshingly engages with said second threaded portion so as to secure said attachment mechanism to said valve body, and said first channel and said second channel are aligned when said first threaded portion is meshingly engaged with said second threaded portion.

3. The assembly of claim 1, wherein:

said first stop includes a cam surface, an angle is defined by said cam surface and said valve body, and said angle has a magnitude greater than 90°.

4. The assembly of claim 3, wherein:

said tab includes a cam follower surface, and said cam follower surface contacts said cam surface when said arm is moved from said first lowered position to said second lowered position.

5. The assembly of claim 1, wherein:

said second stop includes a stop surface, a first angle is defined by said stop surface and said valve body, and said first angle has a magnitude approximately equal to 90°.

6. The assembly of claim 5, wherein:

said first stop includes an abutment surface, a second angle is defined by said abutment surface and said valve body, and said second angle has a magnitude approximately equal to 90°.

7. The assembly of claim 6, wherein:

said tab further includes a rear face and a lower face, a third angle is defined by said rear face and said lower face, and said third angle has a magnitude approximately equal to 90°.

8. The assembly of claim 1, wherein:

said first channel defines a central axis, and said tab is axially spaced apart from said second threaded portion of said attachment mechanism relative to said central axis.

9. The assembly of claim 1, wherein said base and said arm are integrally molded as one part.

10. The assembly of claim 9, wherein:

said valve body, said first stop and said second stop are integrally molded as one part.

11. The assembly of claim 1, wherein:

said attachment mechanism further includes a gripping flange extending outwardly from said base.

12. The assembly of claim 11, wherein said base, said arm and said gripping flange are integrally molded as one part.

13. The assembly of claim 2, wherein:

said first threaded portion is defined in an outer surface of said valve body, and said second threaded portion is defined in an inner surface of said attachment mechanism.

14. A water valve assembly, comprising:

a valve body;

a stop structure attached to said valve body, said stop structure having a recess defined therein; and an attachment mechanism having a base and an arm, said arm being attached to said base, and said arm including a tab, wherein said arm is positionable in a first lowered position relative to said base when said tab is located outside of said recess, wherein said arm is positionable in a second lowered position relative to said base when said tab is located within said recess, and wherein said tab contacts said stop structure so as to move said arm relative to said base when said arm is moved from said first lowered position to said second lowered position.

15. The assembly of claim 14, wherein:

said stop structure includes a first stop, said first stop includes a cam surface, an angle is defined by said cam surface and said valve body, and said angle has a magnitude greater than 90°.

16. The assembly of claim 14, wherein:

said stop structure includes a first stop and a second stop, said recess is defined between said first stop and said second stop, said second stop includes a stop surface, a first angle is defined by said stop surface and said valve body, and said first angle has a magnitude approximately equal to 90°.

17. The assembly of claim 16, wherein:

said first stop includes an abutment surface, a second angle is defined by said abutment surface and said valve body, and said second angle has a magnitude approximately equal to 90°.

18. The assembly of claim 17, wherein:

said tab further includes a rear face and a lower face, a third angle is defined by said rear face and said lower face, and said third angle has a magnitude approximately equal to 90°.

19. The assembly of claim 14, wherein:

said valve body has a channel defined therein, said attachment mechanism has a threaded portion defined therein, said channel defines a central axis, and said tab is axially spaced apart from said threaded portion relative to said central axis.

20. The assembly of claim 14, wherein:

said attachment mechanism further includes a gripping flange extending outwardly from said base.

* * * * *